May 1, 1923.
V. W. PAGÉ
1,453,990
TILTING STEERING WHEEL
Filed May 19, 1921    2 Sheets-Sheet 1
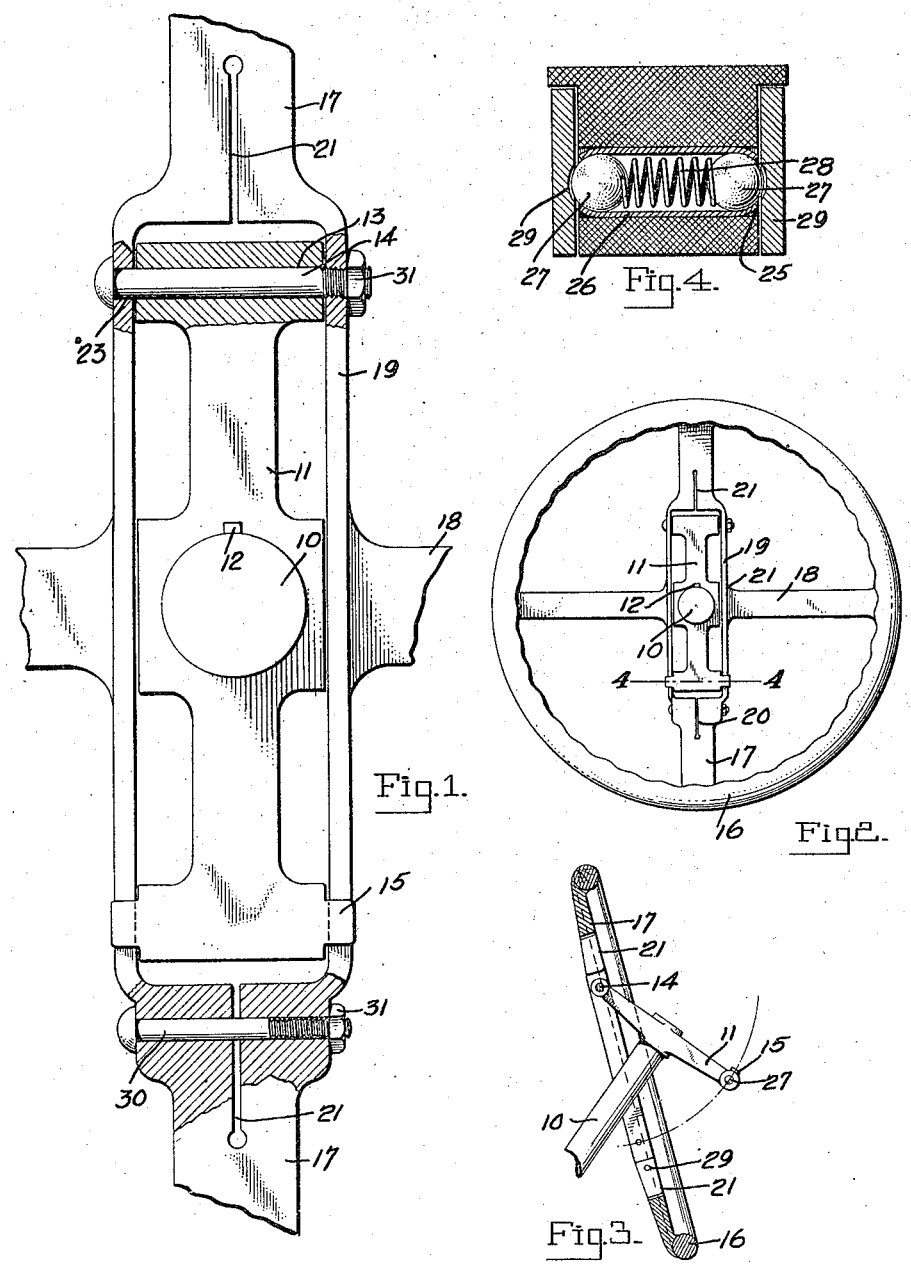
Witnesses
Thomas Reichert
P. D. Rothrauve
Inventor
Victor W. Pagé
By Attorney May 1, 1923.
V. W. PAGÉ
1,453,990
TILTING STEERING WHEEL
Filed May 19, 1921   2 Sheets-Sheet 2
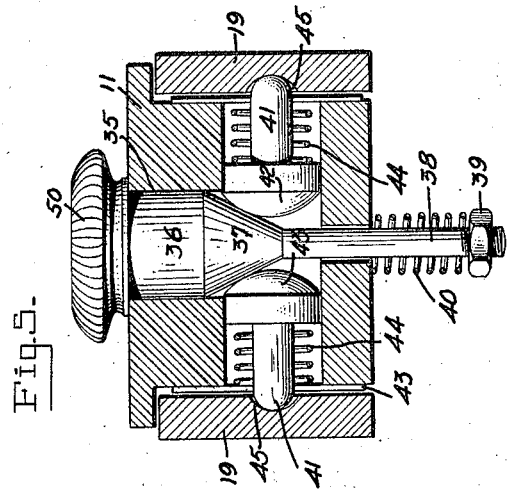
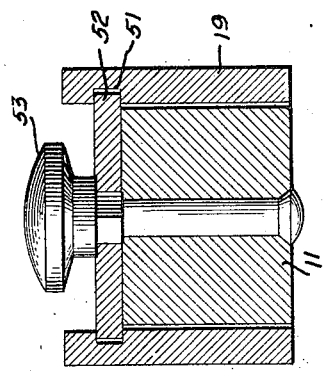
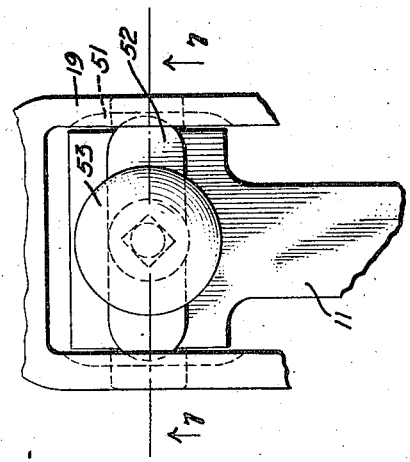
WITNESSES
Inventor
VICTOR W. PAGÉ
Attorney Patented May 1, 1923.

1,453,990

UNITED STATES PATENT OFFICE.

VICTOR W. PAGÉ, OF KEW GARDENS, NEW YORK.

TILTING STEERING WHEEL.

Application filed May 19, 1921. Serial No. 470,986.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Tilting Steering Wheel, of which the following is a full, clear, and exact description.

The present invention relates to new and useful improvements in steering wheels more particularly adapted for use in motor vehicles.

It is one of the objects of the present invention to construct a steering wheel which is capable of swinging or tilting movement relative to the steering post in order that more easy access may be had to the driver's seat.

It is a further object of the invention to provide a new and improved locking means for securing the wheel in operative connection with the steering post.

It is a still further object of the invention to so construct the steering wheel that its mounting may be contracted in order to provide a rigid structure when the wheel is operatively connected to the steering post.

Referring to the drawings—

Figure 1 is a detail plan view partly in section of a steering post constructed in accordance with the present invention;

Fig. 2 is a top plan view thereof;

Fig. 3 is a sectional view showing the steering wheel in its tilted position;

Fig. 4 is a detail sectional view of one form of lock, taken on the line 4—4 of Fig. 2;

Fig. 5 is a detail sectional view of a modified form of lock;

Fig. 6 is a detail view of a still further modified form of lock, and

Fig. 7 is a transverse sectional view taken on the line 7—7 of Fig. 6.

Referring more specifically to the drawings and particularly to Fig. 1, the reference character 10 designates the steering post, and 11 designates a head splined to the post 10 by means of a key or the like 12. This head is substantially T-shaped and in one of its ends it is provided with an opening or passageway 13, adapted for the reception of a bolt 14. The opposite end of the head 11 is provided on the top face with stops in the form of integral lugs 15. The reference character 16 designates a steering wheel and said steering wheel is provided with spokes 17 and 18. The spokes 17 are formed with a spider or yoke member 19, and extending from the yoke member 19 into the spokes 17, are kerfs or slots 20, the purpose of which will be hereinafter more specifically described. The spokes 18 terminate at 21 and are connected rigidly with the sides of the spider or yoke 19. The bolt 14 heretofore mentioned passes through the sides of the yoke as indicated by the reference character 23, and this bolt forms the means by which the steering wheel is pivotally mounted upon the head 11.

The opposite end of the head 11 is formed as shown in Fig. 4, with a transverse passage 25, and mounted in said passage is a shell 26. Mounted in the shell 26 are two spherical members 27 forced in opposite directions by means of an interposed coil spring 28. The sides of the yoke or spider 19 are notched as at 29, and adapted to receive the spherical members in such a manner as to prevent accidental displacement of said spherical members 27 from their respective curved seats or notches 29 to maintain the steering wheel in operative relation with the post 10. The lugs 15 heretofore mentioned serve to limit the upward movement of the wheel.

In this form of the invention, when it is desired to tilt the wheel, sufficient pressure is exerted thereupon, and the spherical members 27 disengage their respective seats and permit of the wheel swinging to the position shown in Fig. 3.

When it is desired to operatively connect the wheel with the steering post, the same is lifted until the spherical members engage their respective seats 29 and the sides of the yoke 19 engage the lugs 15, in which position the wheel will be operatively connected with the steering post and will be maintained in such relation against accidental displacement.

Extending through the yoke member at the opposite end to the bolt 14, is a bolt 30, and each of the bolts 30 and 14 is provided with a nut 31, which nuts when tightened will cause a contraction of the kerfs 20 in the spokes 17 and thus permit of a tightening of the several parts to prevent rattling thereof.

In Figure 5 is shown a slightly modified form of the invention and in this form the head 10 is formed with a vertical passage 35, in which is mounted a reciprocating member 36, having an inclined or tapered surface 37. This member 36 is provided with an elongated portion 38, the lower end of which is threaded to receive a nut 39. Interposed between the nut 39 and the bottom of the head 11, is a coil spring 40 by means of which the member 36 is maintained in the position shown in Fig. 5.

Mounted for transverse sliding movement in the head 10, are opposed bolts 41, and each of said bolts has a curved head 42 adapted to engage the inclined or angular portion 37 of the member 36. Interposed between these heads 42 and plate 43 secured to the sides of the head 10, are coil springs 44 which tend to force the members 41 inwardly of the head member 10. These bolts 41 are each adapted to engage a seat 45 in the side of the yoke or spider 19 to prevent movement of the yoke or spider 19 relatively to the head 10.

The device operates in the following manner: When it is desired to tilt the wheel, the member 36 is reciprocated by means of its operating knob 50, and as the same is elevated the springs 44 force their respective members so that their ends disengage the recesses 45, in which position the yoke or spider 19 is free to drop and permit the wheel to move to the position shown in Fig. 3.

In Figures 5 and 7 is shown a still further modified form of the invention and in this form the yoke or spider 19 is provided with recesses 51. Mounted upon the head 11 is a latch member 52 and said latch member is rotated by means of an operating knob or the like 53. By this construction it will be apparent that as the operating knob 53 is turned so that the latch member assumes a position at right angles to that shown in Figs. 6 and 7, the yoke 19 will be free to drop and permit the steering wheel to move to the position shown in Fig. 3.

From the foregoing it will be seen that the present invention not only provides a steering wheel and locking means whereby the same may be operatively connected to the steering post, but also provides for an adjustment for taking up wear, said adjustment being in the form of bolts 14 and 30, which serve to contract the yoke or spider 19 to the desired degree.

I claim:

In a collapsible steering wheel, a head adapted to be carried by the steering post, a wheel, a yoke formed in the spokes of said wheel and adapted to embrace the head, said yoke having kerfs extending into the spokes of the wheel at the ends of the yoke, means for pivotally mounting the wheel on said head, said means also serving to contract that end of the yoke which is pivotally secured to the head to take up wear, and separate means passing through the yoke at its free end for contracting said free end to take up wear therein.

VICTOR W. PAGÉ.